INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

| ELEMENT | A | B | A-B | B-A | \|A-B\| |
|---|---|---|---|---|---|
| 1. | 0 | 0 | 0 | 0 | 0 |
| 2. | 0 | 1 | -1 | 1 | 1 |
| 3. | 1 | 0 | 1 | -1 | 1 |
| 4. | 1 | 1 | 0 | 0 | 0 |

| ELEMENT | A' | \|A-B\| | A'-\|A-B\| | \|A-B\|-A' | B'=\|\|A-B\|-A'\| |
|---|---|---|---|---|---|
| 1. | 0 | 0 | 0 | 0 | 0 |
| 2. | 0 | 1 | -1 | 1 | 1 |
| 3. | 1 | 1 | 0 | 0 | 0 |
| 4. | 1 | 0 | 1 | -1 | 1 |

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

United States Patent Office 3,461,231
Patented Aug. 12, 1969

3,461,231
INFORMATION TRANSMISSION SYSTEM AND METHOD

Robert V. Quinlan, Fort Wayne, Ind., assignor to International Telephone and Telegraph Corporation, Nutley, N.J., a corporation of Maryland
Filed Nov. 16, 1964, Ser. No. 411,288
Int. Cl. H04n 3/28, 7/00
U.S. Cl. 178—6.8 32 Claims

ABSTRACT OF THE DISCLOSURE

An information transmission system and method usable in a television system or data transmission system, which analyzes redundancy in two directions in order to increase the potentiality for time-bandwidth compression. In the television form of the system, a dual beam camera tube is provided with rectilinear scanning for simultaneously generating first and second video signals in response to two adjacent scanning lines, respectively, each line of the input optical image thus being scanned twice with the second video signal thus being duplicative of the first video signal but delayed therefrom by the duration of one scanning line. The first and second video signals are compared and a third video signal is generated in response to any amplitude difference between the first and second video signals, thus increasing the redundancy of the third video signal over the redundancy of the first and second video signals considered individually. The third video signal is transmitted and received, conventional time-bandwidth compression and restoration being employed in the transmission and reception process. A display tube is provided with rectilinear scanning for displaying a fourth video signal in successive scanning lines. A fifth video signal is generated duplicative of the fourth video signal but delayed therefrom by the duration of one of the scanning lines, as by combining the display tube with a camera tube which scans the displayed image one line behind the displayed line. The received third video signal is simultaneously compared with the fifth video signal to generate the fourth video signal in response to an amplitude difference between the received third and fifth video signals.

This invention relates generally to information transmission systems and methods, and more particularly to a system and method for increasing redundancy in a time-based signal in order to increase the potential for time-bandwidth compression of the transmitted signal.

Time-based electrical signals are utilized in certain information transmission systems including data transmission systems and television systems. Conventional data transmission systems employ binary pulses of fixed duration in coded sequences whereas conventional television systems employ variable amplitude, and most often variable duration, video signals. In both types of information transmission systems, it is frequently desirable to provide minimum transmission time and/or minimum transmission bandwidth. Since pulse width is the reciprocal of bandwidth, and pulse width is in turn directly proportional to the transmitting speed in the case of data transmission systems and to the scanning speed in the case of television systems, transmission of binary coded data at the requisite high speed and transmission of a minimum size television picture element at conventional scanning rates with optimum resolution has required a wide band of signal frequencies, thus in turn necessitating employment of a wide band transmission facility such as a microwave radio link or coaxial cable. Such wide band transmission facilities are, however, expensive and further are not always readily available or feasible and thus, there are instances where it is desirable to transmit such information-conveying time-based signals over narrow band facilities, such as ordinary telephone lines. In the case of binary coded data transmission systems, this has required operation of the transmitting apparatus at a correspondingly low speed, and has necessitated the employment of slow scanning rates in the case of television systems.

In order to provide faster transmission rates and/or narrower transmission bandwidths, various time-bandwidth compression techniques have been proposed, such as those described and illustrated in application Ser. No. 318,682 of W. W. Greutman and N. E. Hoag and application Ser. No. 385,625 of Robert V. Quinlan, both assigned to the assignee of the present application. Such prior bandwidth compression systems detected predetermined amounts of redundant information in the initial time-based signal and transmitted a single coded signal element in response thereto.

The greater the redundancy in an information-conveying time-based signal, the greater the time-bandwidth product of the signal can be reduced. The foregoing Greutman-Hoag and Quinlan applications analyze the redundancy only in the direction of scanning, i.e., typically horizontally, and no attempt is made to analyze redundancy in other directions. However, examination of typical pictorial or textual material indicates that horizontal and vertical redundancy is generally of the same magnitude. It is therefore desirable to provide an information transmission system and method in which redundancy in two directions is analyzed in order to increase the potentiality for time-bandwidth compression.

In accordance with the broader aspects of the invention, redundancy between two video signals corresponding to adjacent scanning lines in the case of a television system, or redundancy between two identical but time-displaced signals in the case of a data transmission system is employed, the two signals being compared and a third signal generated in response to a difference between the two signals; if the two signals are simultaneously identical, thus indicating redundancy, no signal is generated. It is thus seen that the redundancy of the third signal may be substantially increased over the redundancy of the two individual signals, thus permitting greater time-bandwidth compression than is possible where only the redundancy of a single signal is analyzed.

More particularly, in accordance with the invention, a first time-based electrical signal is generated having a characteristic variable in response to the information to be transmitted and a second time-based electrical signal is generated duplicative of the first signal but delayed therefrom by a predetermined time. The information-conveying characteristics of the first and second signals are simultaneously compared and a third time-based electrical signal is generated having a characteristic variable in response to a difference between the first and second signal characteristics, the third signal being transmitted and received at a remote location. A fourth time-based electrical signal having a variable information-conveying characteristic is converted into output information and a fifth time-based electrical signal is generated duplicative of the fourth signal but delayed therefrom by the same predetermined time. The information-conveying characteristics of the received third signal and the fifth signal are simultaneously compared and the fourth signal is generated having its characteristic variable in response to a difference between the third and fifth signal characteristics. The bandwidth of the third signal may be compressed prior to transmission and restored following reception.

It is accordingly an object of the invention to provide a system and method for increasing the redundancy of an information-conveying time-based electrical signal.

A further object of the invention is to provide an improved system and method of time-bandwidth reduction for use in an information transmission system.

The above-mentioned and other features and objects of this invention and the manner of attaining them will become more apparent and the invention itself will be best understood by reference to the following description of an embodiment of the invention taken in conjunction with the accompanying drawings wherein.

Figures 4, 5:
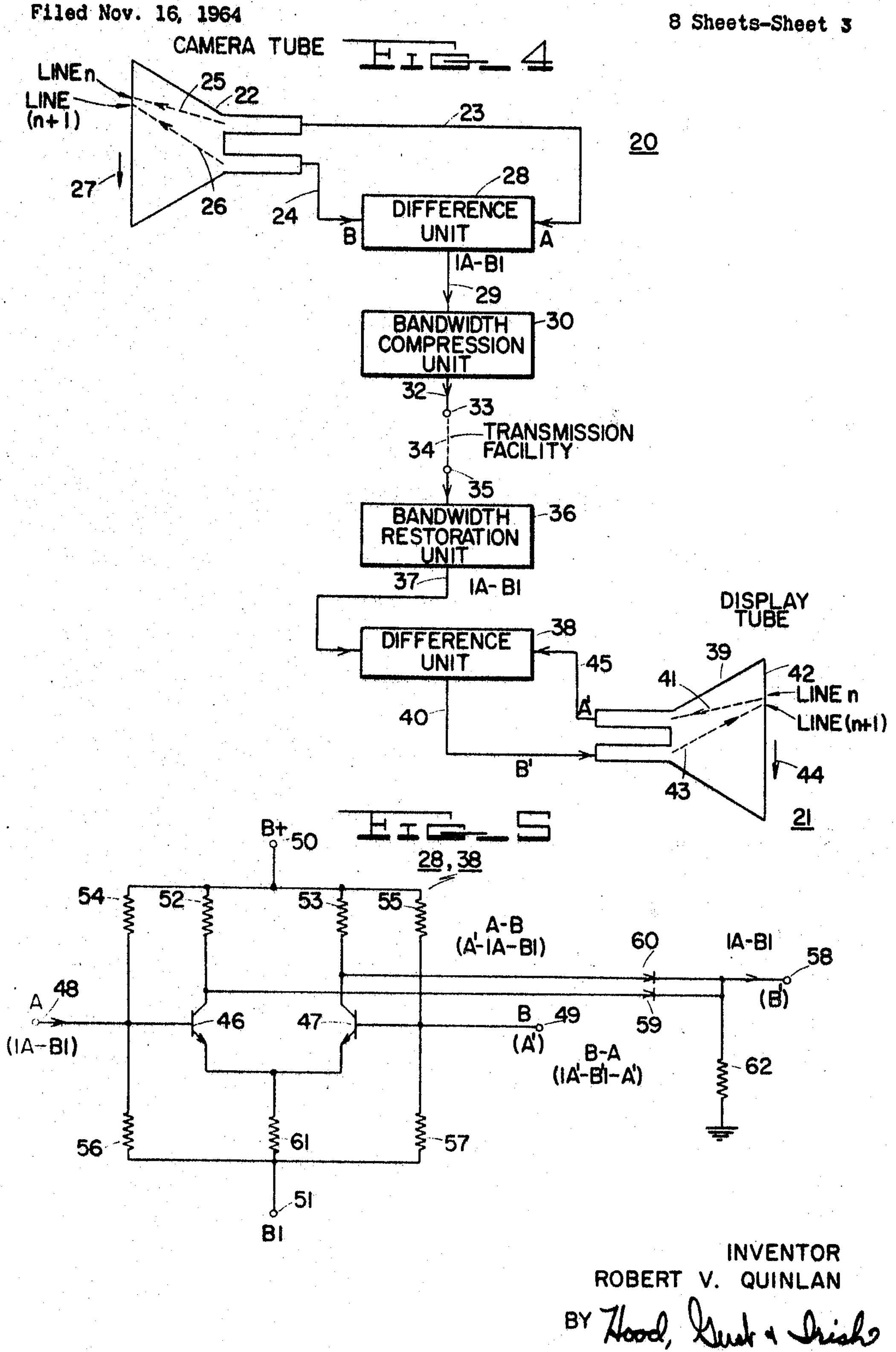
FIG. 4 is a diagram schematically illustrating one embodiment of the system of the invention.
FIG. 5 is a schematic diagram showing the difference units employed in the system of FIG. 4.
Figure 10:
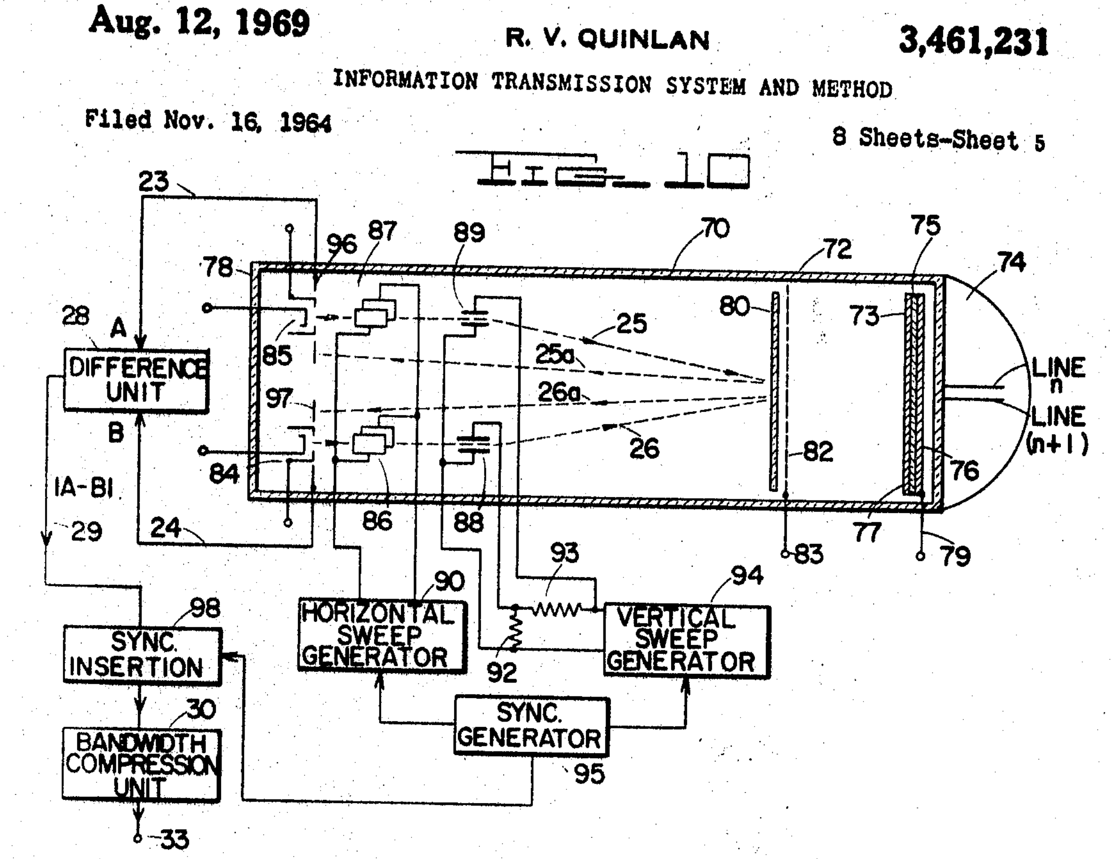
Figure 11:
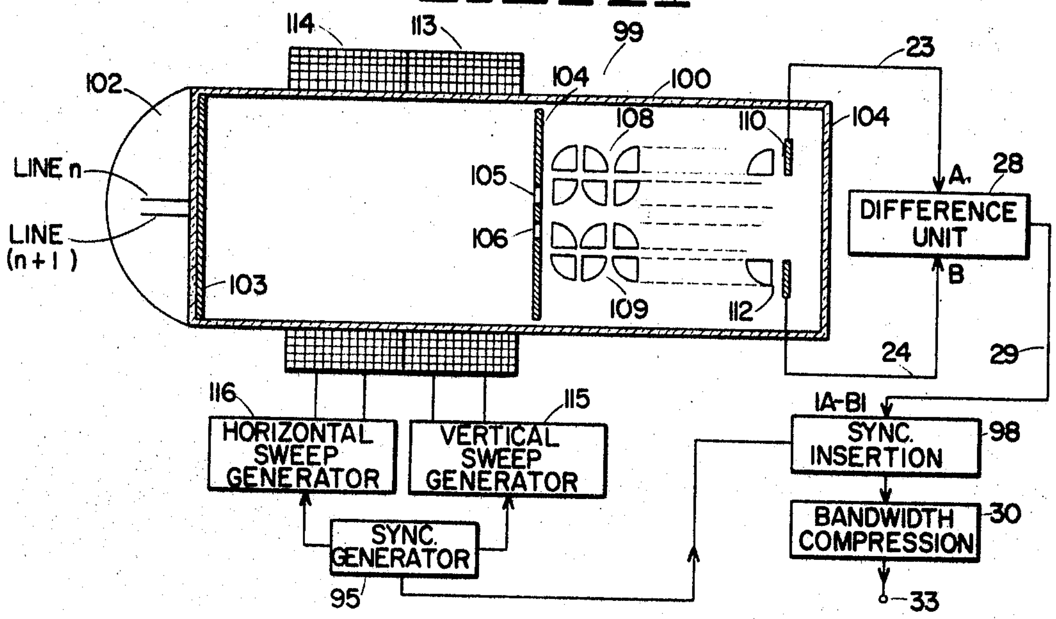
Figure 14:
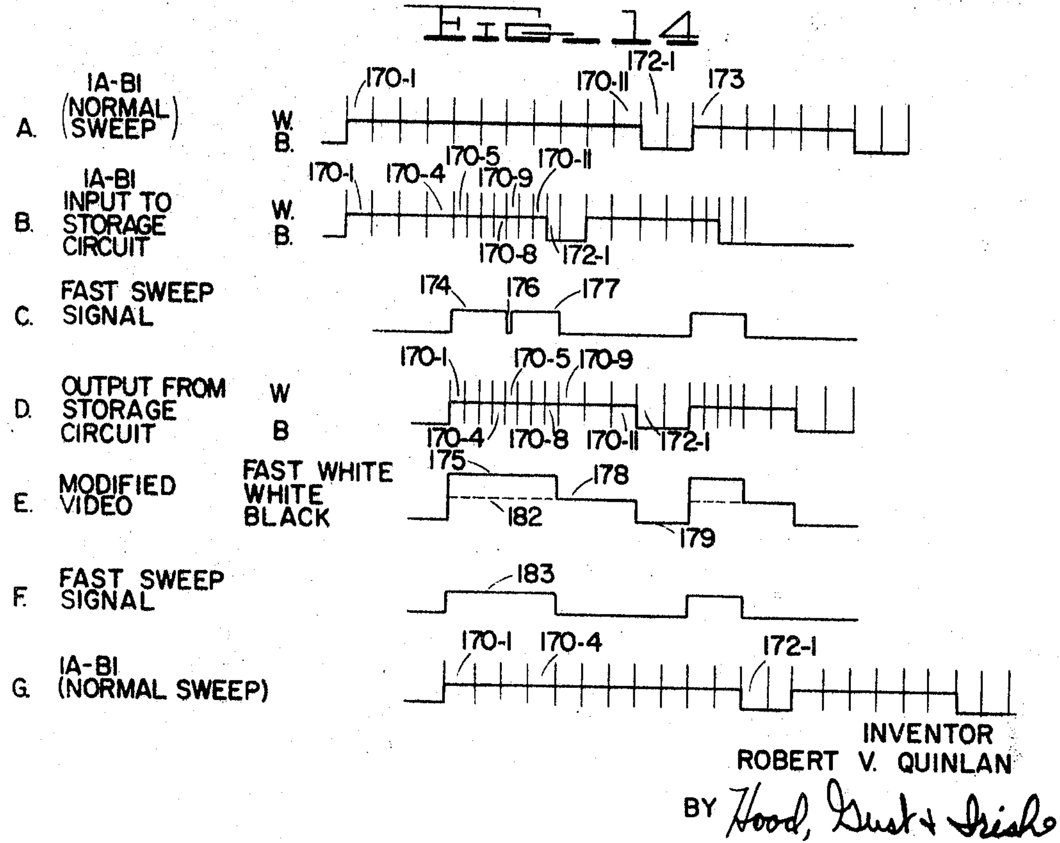
Figure 12:
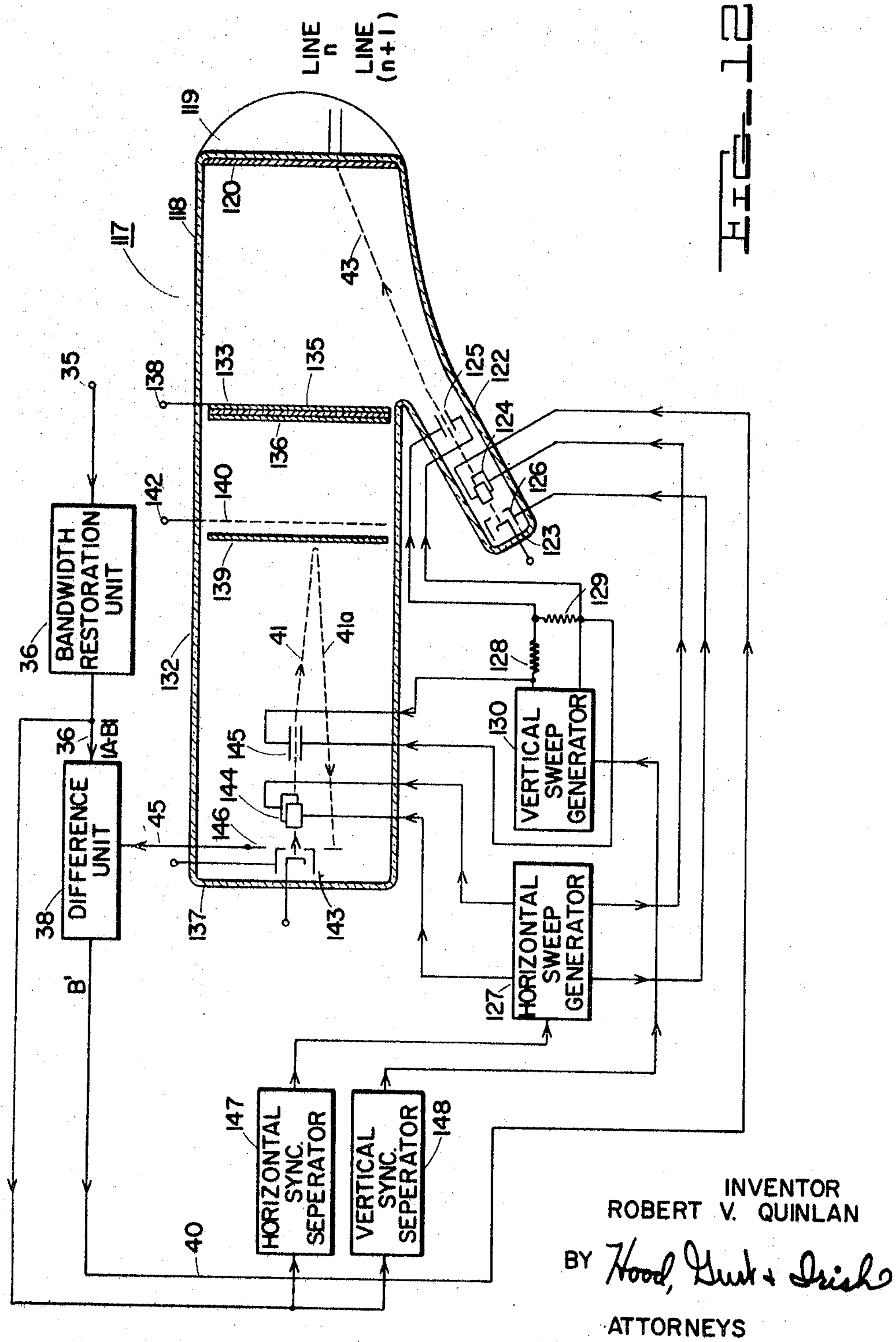
Figure 13:
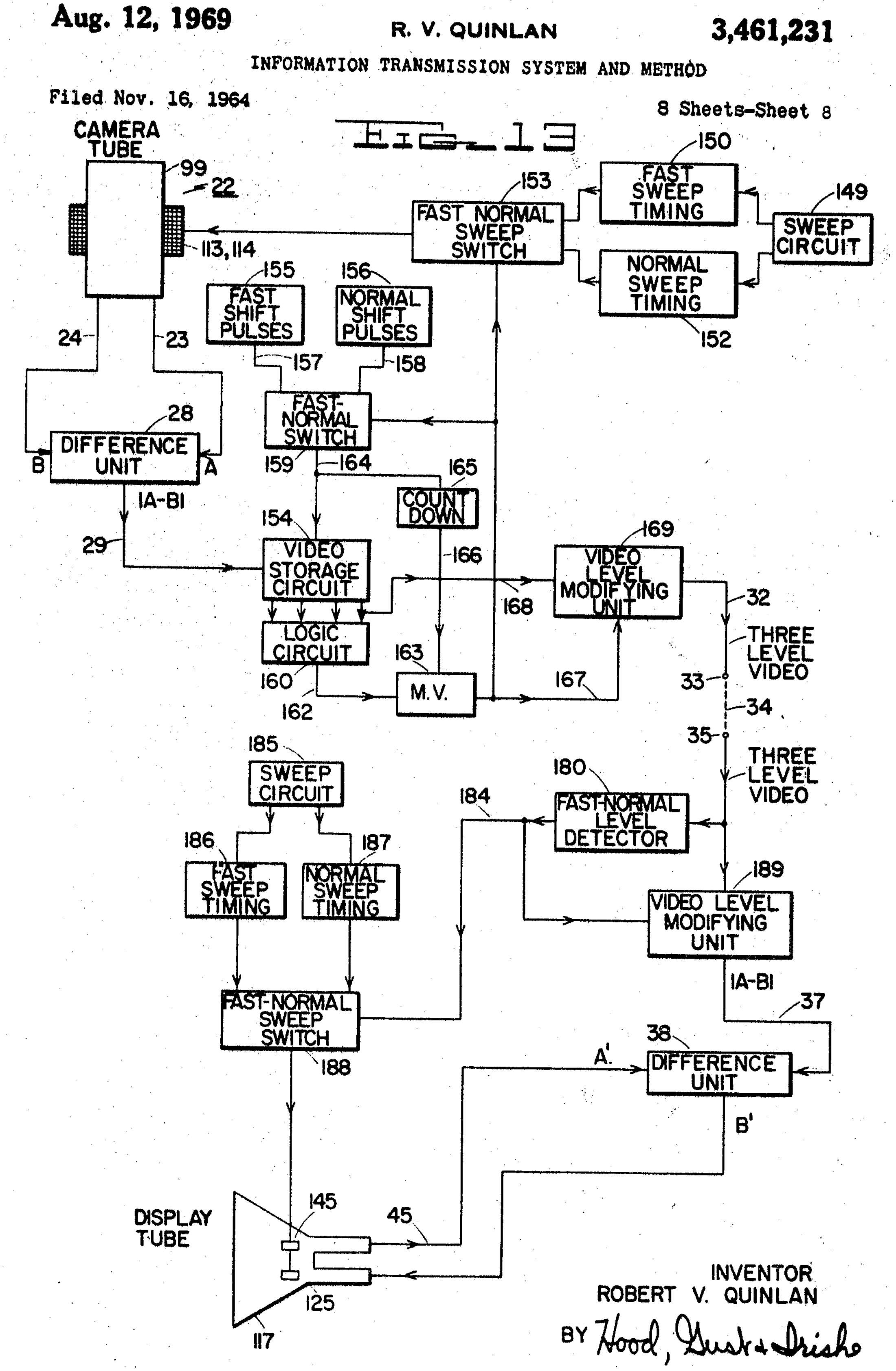

FIG. 10 schematically illustrates one form of camera tube which may be employed in the system of FIG. 4;

FIG. 11 schematically illustrates another form of camera tube which may be used in the system of FIG. 4;

FIG. 12 schematically illustrates one form of display tube which may be used in the system of FIG. 4;

FIG. 13 is a diagram schematically illustrating one form of time-bandwidth compression system which may be employed in conjunction with the system of FIG. 4; and FIG. 14 shows wave forms provided by the time-bandwidth compression system of FIG. 13.

While it will become apparent as the description proceeds that the method of the invention is applicable, in the case of a television system, to the transmission of continuous tone images, i.e., images varying from black to white through a gray scale and to the transmission of binary coded data, for the sake of simplicity of explanation, the television transmission of black-and-white copy will be described.

Figure 1:
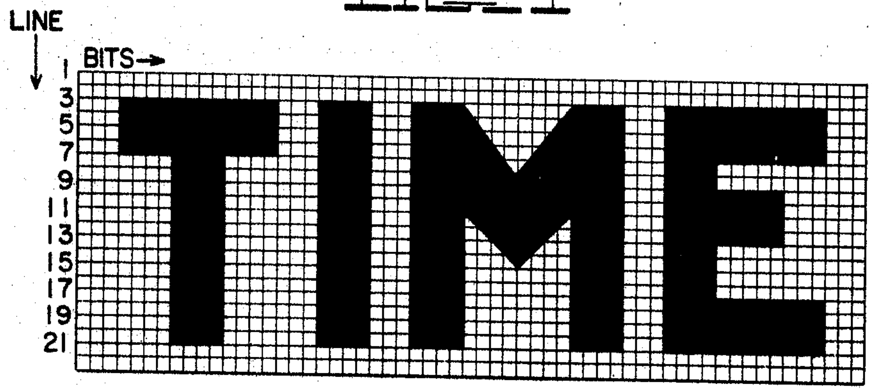
FIG. 1 shows typical black and white copy for television transmission.
Figure 2:
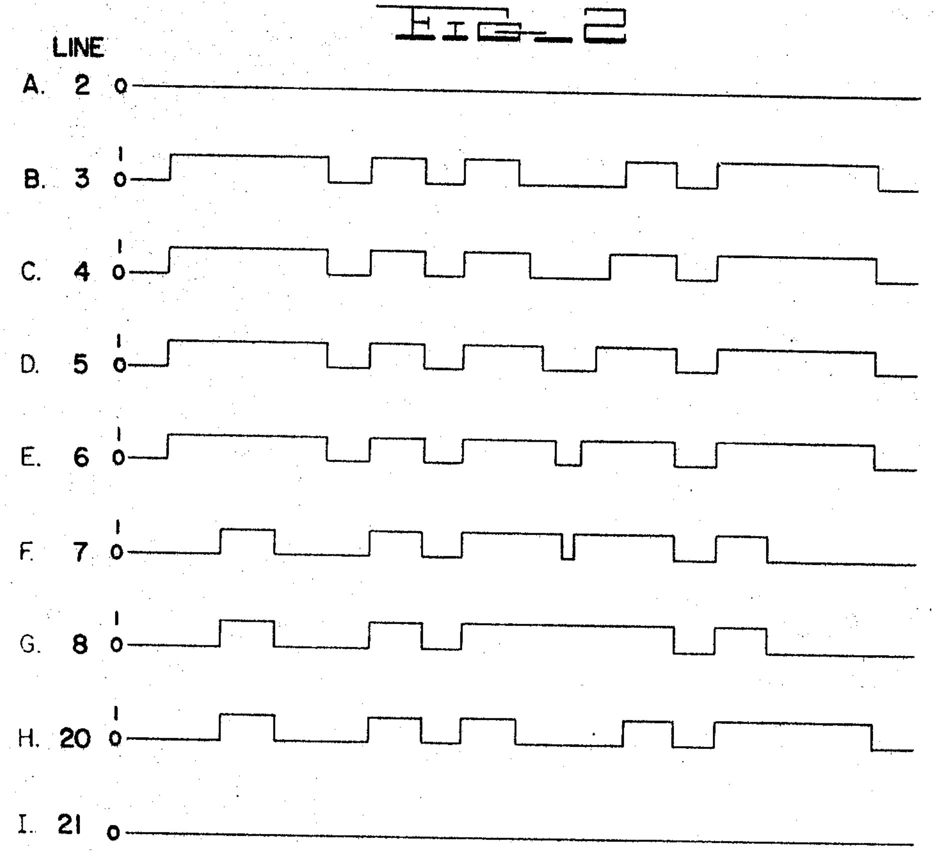
FIG. 2 shows the normal video signals obtained from various scanning lines on the copy of FIG. 1.

Referring now to FIG. 1, a typical black-and-white or two-color copy for television transmission is shown arbitrarily divided into twenty-two horizontal scanning lines, each line being considered to be divided into fifty-nine picture elements. FIGS. 2A through I shows the time-based video signal wave forms provided by conventional single line-at-a-time scanning of lines 2 through 8, 20 and 21 of the copy of FIG. 1, these video signals for the sake of illustration being shown as "black" positive and "white" negative, i.e., "one"-black and "zero"-white. Analysis of the video signal wave forms of FIGS. 2A through I and also of the wave forms provided by the same normal scanning of lines 9 through 19 and 22 of the copy of FIG. 1, reveals that there are 532 "black" elements, i.e., "ones" and 766 "white" elements, i.e., "zeros"; if an element is more than half "black" it is considered to be "black" since gray scale is not transmitted.

Figure 3:
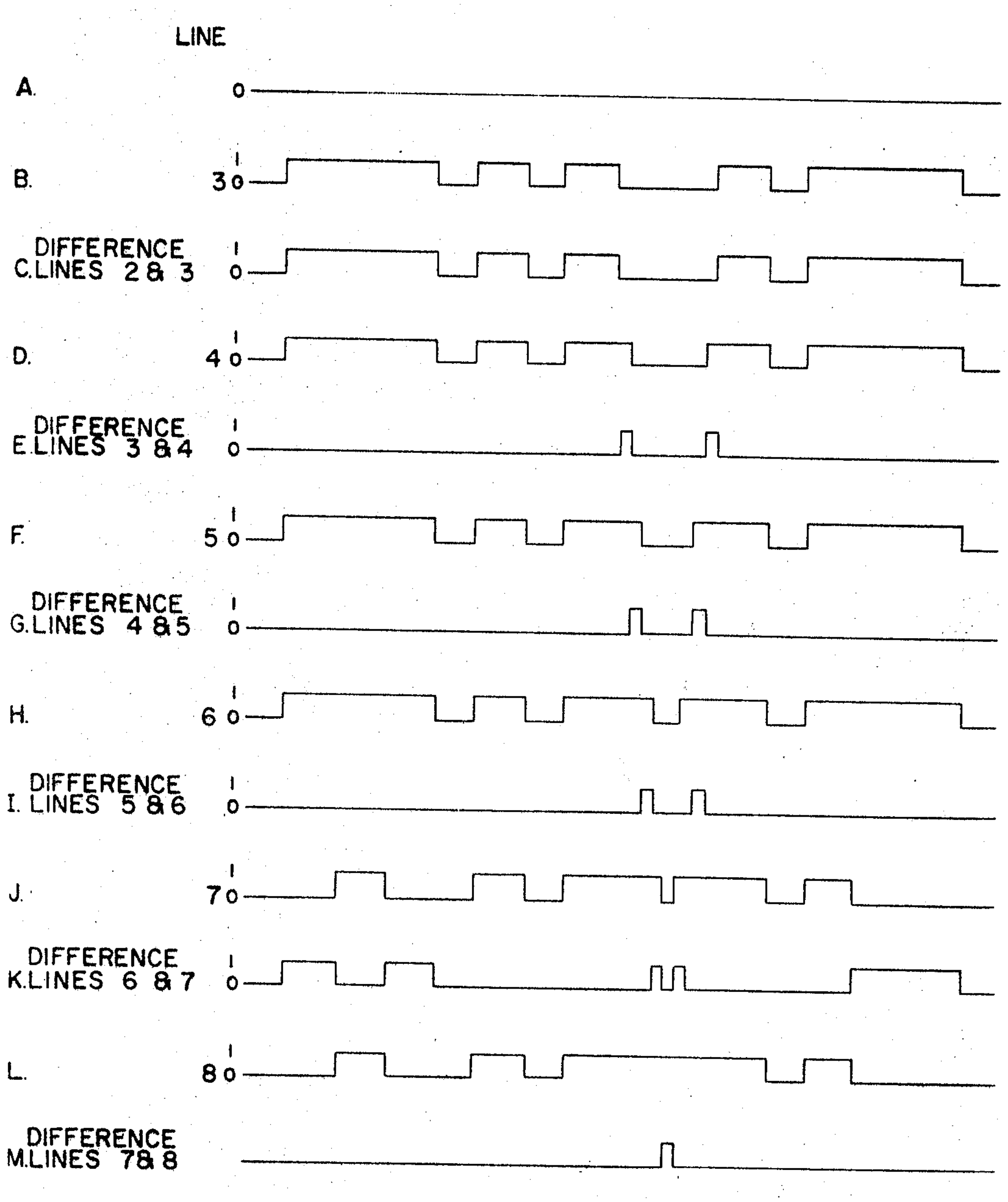
FIG. 3 shows the video signals provided by the difference scanning line system and method of the invention.

Referring now to FIG. 3, wave forms are shown resulting from the simultaneous scanning of two adjacent lines of the copy of FIG. 1 and comparison of the resulting signals to provide difference signals. Thus, FIG. 3A and B shows the wave forms provided by simultaneous scanning of both lines 2 and 3 of the copy of FIG. 1 while FIG. 3C shows the wave form of the video signal which is the difference between the video signals of lines 2 and 3; it will be seen that since the video signal of line 2 is all "white," i.e., "zero," the difference between the signals of lines 2 and 3 provides a signal which is duplicative of the signal of line 3.

FIGS. 3B and D show the wave forms of the video signals provided by simultaneous scanning of lines 3 and 4 of the copy of FIG. 1 while FIG. 3E shows the difference signal provided by comparison of the video signals responsive to simultaneous scanning of lines 3 and 4. Likewise, FIGS. 3D and F show the wave forms of the video signals provided by simultaneous scanning of lines 4 and 5 of the copy of FIG. 1 while FIG. 3G shows the difference signal provided as a result of the comparison of video signals responsive to the scanning of lines 4 and 5. Further, FIGS. 3F and H show the video signals provided by simultaneous scanning of lines 5 and and 6 of the copy of FIG. 1 while FIG. I shows the difference signal resulting from the comparison of those two video signals. FIGS. 3H and J show the video signals provided by simultaneous scanning of lines 6 and 7 of the copy of FIG. 1 while FIG. 3K shows the difference signal resulting from the comparison of those two signals, and finally FIGS. 3J and L show the video signals resulting from simultaneous scanning of lines 7 and 8 of the copy of FIG. 1 while FIG. 3M shows the difference signal resulting from the comparison of the video signals of FIGS. 3J and L.

It will thus be seen that the difference signals shown in FIGS. 3C, E, G, I, K and M contain a substantially larger amount of redundancy than the scanned video signals responsive to scanning of each individual line of the copy of FIG. 1 as shown in FIGS. 3B, D, F, H, J, and L. Analysis of the difference signals shown in FIGS. 3C, E, G, I, K and M together with analysis of the remaining difference signals provided by comparison of the video signals generated in response to simultaneous scanning of the remaining adjacent successive pairs of lines of the copy of FIG. 1 will reveal that only 114 "black" elements ("ones") are provided compared with 1184 "white" elements ("zeros").

Referring now to FIG. 4, there is shown a system in accordance with one embodiment of the invention comprising a transmission or camera station 20 and a receiving or display station 21. Transmission station 20 comprises a camera tube 22 having conventional means for converting an optical image into a corresponding electrical characteristic pattern. Camera tube 22, which may be one of the dual output-type camera tubes herein after described in conjunction with FIGS. 10 and 11, is provided with two output circuits 23, 24 and means for rectilinearly scanning the electrical characteristic pattern in two adjacent successive lines, as shown by the dashed lines 25, 26, the vertical scanning being in the direction shown by the arrow 27. Thus, a first time-based video signal is generated in output circuit 24 responsive to scanning line $n+1$ while a second time-based video signal is generated in output circuit 23 responsive to scanning line $n$. It is thus seen that each line on the electrical characteristic pattern, which corresponds to the input optical image, is scanned twice, first by the scanning beam 26 and then by the scanning beam 25, and that as a result, the video signal generated in output circuit 23 is duplicative of the video signal generated in output circuit 24, but delayed therefrom by the duration of the one scanning line.

The first video signal, identified as signal B and the second video signal, identified as signal A, are applied to difference unit 28, to be hereinafter more fully described, which compares the two video signals A and B and generates a third signal which is equal to the magnitude of the difference between the two input video signals A be applied to the receiving difference unit 38 so that the signal B′ scanned by beam 43 would be the original signal B generated in response to scanning by beam 26 of the first line of the image to be transmitted. Thus, the first line scanned and displayed by display tube 39 will be duplicative of the first line scanned by beam 26 of camera tube 22, i.e., the first line of the image is transmitted and displayed per se. At the completion of the scanning of the first line of the image to be transmitted, beams 26, 25 of the camera tube 22 are scanned downwardly in direction 27 so that beam 25 scans the first $n$ previously scanned by the beam 26 and the beam 26 scans the second line $n+1$. A video signal A is now provided in response to scanning the first line $n$ by beam 25 which is compared by the difference unit 28 with the video signal B in response to the scanning of the second line $n+1$ by beam 26 thereby to provide the difference signal $|A-B|$. In the display tube 39, at the end of the scanning of the first line by beam 43 alone, beams 41, 43 are scanned downwardly so that beam 41 is scanning the first line $n$ previously scanned and displayed by beam 43 while beam 43 is scanning and displaying the second line $n+1$. The video signal A′ is thus generated in response to scanning of line $n$ by beam 41, video signal A′ thus corresponding to the initial video signal B responsive to scanning of the first line $n$ by beam 26 in the camera tube 22. Video signal A′ is thus compared with the difference signal $|A-B|$ in the difference unit 38 to provide the resulting difference signal B′ which is scanned and displayed by beam 43 to provide line $n+1$ on the display tube 39.

The second method for providing an initial reference signal for the display tube 39 which does not require overscanning of the camera tube 22 and the display tube 39 is to employ a predetermined initial reference signal in both the transmitter and receiver. Almost all copy or pictures, such as the copy shown in FIG. 1, includes a white border and thus an initial all "white" scanning line can be employed as a reference signal for starting a frame. Thus, it is seen that with beams 25, 26 simultaneously scanning lines 2 and 3 of FIG. 1, a "white" or "zero" video signal A is provided while video signal B is responsive to the "black" and "white" contrasting elements of line 3. Since video signal A is a constant "zero," the difference signal $|A-B|$ is duplicative of video signal B responsive to the scanning of line 3 $n+1$ as shown in FIG. 3C. This difference signal $|A-B|$ is applied to the receiving difference unit 38 and since no line $n$ has previously been scanned during the frame, no signal A′ is initially available so that the input signal $|A-B|$ appears as the output signal B′. Thus, beam 43 initially scans and displays the $|A-B|$ signal which, as indicated, is duplicative of input video signal B responsive to scanning of the third line $n+1$ by beam 26. Thus, when lines 3 and 4 are scanned by beams 25, 26, the $|A-B|$ line previously scanned by beam 43 becomes line $n$ to be scanned by beam 41 to provide video signal A′ for comparison with the new difference signal $|A-B|$ by the difference unit 38.

It will now be seen that with horizontal raster scanning from top to bottom, as shown, each element of each scanning line is compared with the element of the line directly above, with the contents of the upper scanning line being used as a reference, and a signal is generated which is proportional to the difference in amplitude or luminance between each two adjacent video elements, one in each scanning line. It will further be observed that the difference scanning line system thus far described, does not in itself decrease the time-bandwidth product of the resulting difference signal, but does increase the redundancy of the signal which permits substantially increased time-bandwidth compression, as will be hereinafter more fully described.

Figure 9:
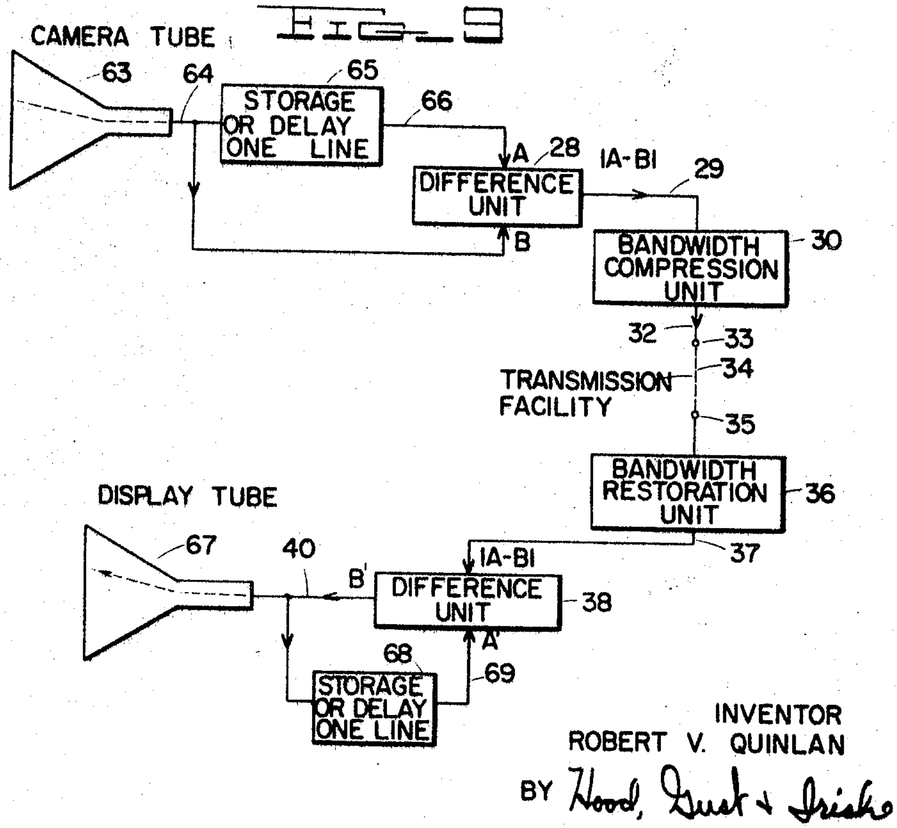
FIG. 9 is a diagram schematically illustrating another embodiment of the system of the invention.

Referring now to FIG. 9 in which like elements are indicated by like reference numerals, a system is shown which employs conventional camera and display tubes and which therefore does not require the special dual-beam tubes of the system of FIG. 4. It will be observed that in the system of FIG. 4, the two input signals to each difference unit 28, 38 are separated by the duration of one horizontal scanning line, i.e., video signal A is delayed from video signal B by the duration of one line in the case of difference unit 28 and video signal A′ is delayed from video signal B′ in the case of difference unit 38. It will thus be seen that by delaying the scanned video signal by the duration of one horizontal line, the reference signal A or A′, is generated.

Thus, in the system of FIG. 9, a camera tube 63 is employed which may be of any conventional type, such as a vidicon, image dissector, image orthicon, or iconoscope. Output circuit 64 of camera tube 63 is coupled to the input circuit of a signal delay device 65 which provides a delay equal to the duration of one scanning line in the camera tube 63. Output circuit 66 of the delay device 65 is coupled to the A input circuit of difference unit 28 while output circuit 64 of the camera tube 63 is also directly coupled to the B input circuit in difference unit 28. It will thus be seen that the A video signal applied to the difference unit 28 is duplicative of the initial video signal B provided by the camera tube 63, but is delayed therefrom by the duration of one horizontal scanning line. It will be observed that if the scanning speed of camera tube 63 remains constant at all times, a simple delay line may be employed for the delay device 65. However, if the scanning speed is variable, as in the case of the system of FIG. 13 to be hereinafter described, a sequential storage device must be employed having a storage capacity equal to the number of elements in one scanning line; when one signal element or bit is read into the storage device, one signal element or bit is read out which thus corresponds to the signal element of line $n$ directly above the corresponding signal element of line $n+1$ being scanned.

At the receiving station, a conventional display tube 67 is employed with the B′ video signal output circuit 40 of the difference unit 38 being directly coupled to its signal input circuit. The B′ output circuit of the difference unit 38 is also coupled to the input circuit of delay device 68 which provides a signal delay equal to the duration of one horizontal scanning line. The output circuit 69 of delay device 68 is in turn coupled to the A′ input circuit of the difference unit 38 so that the delayed video signal B′ thus becomes the reference signal A′. The receiving station delay device 68 may be identical to the transmitting station delay device 65, i.e., if constant speed scanning is employed, both devices may be conventional delay lines, or if variable speed scanning is employed, both devices may be sequential storage-type devices, such as shift registers.

Referring now to FIG. 10, there is shown a form of dual beam image orthicon tube which may be employed for the camera tube 22 in the system of FIG. 4. The dual beam camera tube 70 comprises an enclosing envelope 72 having a conventional target electrode assembly 73 disposed adjacent its viewing end 74. Target electrode 73 conventionally comprises a transparent supporting insulator 75 having a transparent conductive coating 76 on the side thereof facing the viewing end 74 of the envelope 72 and having a coating of photo-emissive material 77 on its side facing the opposite end 78 of the envelope 72. Transparent conductive electrode 76 is coupled to external terminal 79 which is adapted to be connected to a suitable source of potential. A suitable insulator 80 is spaced from the target electrode 73 toward end 78 and a secondary emission collector screen 82 is positioned adjacent insulator 80 on the side thereof toward the target electrode 73, collector screen 82 being coupled to external terminal 83 which is adapted to be connected to a suitable source of potential. It will be readily understood that impingement of a radiation image upon target electrode 73 causes emission of a corresponding electron image from the photo-emissive layer 77 toward the insulator 80, the elec- and B, the difference unit 28 thus performing the operation $|A-B|$. As will be hereinafter more fully described, the previously scanned line $n$ is used as a reference for the following line $n+1$ and when corresponding elements of both video signals are identical, i.e., either both "black" or both "white," no output signal is provided, whereas if the two input video signals are simultaneously different, an output signal is generated.

The third or difference signal generated in output circuit 29 of difference unit 28 may then be applied to a suitable time-bandwidth compression unit 30, a suitable form of bandwidth compression unit being hereafter described.

The output circuit 32 of the bandwidth compression unit 30 is coupled to the transmitting end 33 of a conventional narrow band transmission facility, shown by the dashed line 34, which may be a conventional voice band telephone line. The receiving end 35 of the transmission facility 34 is coupled to a bandwidth restoration unit 36 for restoring the original bandwidth of the video signal $|A-B|$.

Output circuit 37 of the bandwidth restoration unit 36 is coupled to one of the input circuits of difference unit 38 which may be identical to the difference unit 28, as hereinafter more fully described. A display tube 39 is provided, which may be of the type hereinafter described in conjunction with FIG. 12. The difference signal B′ generated in output circuit 40 of the difference unit 38 is applied to display tube 39 in conventional fashion and rectilinearly scanned over the display screen 42 in order to convert the difference signal B′ into an output optical image, as shown by the dashed line 43, the direction of vertical scanning being shown by the arrow 44. The beam 43, responsive to the difference signal B′ thus scans line $n+1$ on the display screen 42. A video signal A′ is generated in output circuit 45 of display tube 39 responsive to the previously scanned line $n$ as shown by the dashed line 41, and is applied to the other input circuit of the difference unit 38. Thus, the received difference signal $|A-B|$ is compared with the video signal A′ and the resulting difference signal B′ is displayed, the difference unit 38 thus performing the operation $$\left||A-B|-A'\right|$$

Referring now to FIG. 5 of the drawing, the preferred embodiment of the circuit employed for both difference units 28, 38, is shown. In the preferred embodiment of the difference units 28, 38, identical differential amplifiers are employed for generating an output signal which is equal to the magnitude of the difference between the amplitudes of two input signals. Here, NPN transistors 46, 47 are provided having their bases respectively connected to input terminals 48, 49. The emitters of transistors 46, 47 are connected to suitable source 51 of B− potential by a common emitter resistor 61 while their collectors are respectively connected to suitable source 50 of B+ potential by resistors 52, 53. The bases of transistors 46, 47 are also respectively connected to the B+ source 50 by resistors 54, 55 and to the B− source 51 by resistors 56, 57. The collector of transistor 46 is coupled to output terminal 58 by diode 59 while the collector of transistor 47 is coupled to output terminal 58 by diode 60, output terminal 58 being connected to ground by resistor 62. It will be observed that diodes 59, 60 and resistor 62 form a diode gate for passing positive signals only.

In the case of the transmitting difference unit 28, the A signal is applied to terminal 48 and the B signal applied to terminal 49. The two transistors 46, 47 connected in a differential amplifier configuration thus perform two operations A− B and B− A the difference signal A −B appearing at the collector of transistor 47 and the difference signal B −A appearing at the collector of transistor 46. It will be seen that in the absence of the gate circuit

59, 60, 62, the output signal at the collector of either transistor 46, 47 could be either plus or minus in addition to zero. The gate circuit 59, 60, 62 passes only positive signals appearing at the collectors of the transistors 46, 47 thus performing the operation $|A-B|$ so that the resulting output signal at output terminal 58 is either "zero" or "one," i.e., a bi-level signal.

The operation of the receiving difference unit 38 is identical, the received difference signal $|A-B|$ being applied to input terminal 48 and the signal A′ being applied to input terminal 49. The two transistors 46, 47 thus perform the two operations $A'-|A-B|$ and $|A-B|-A'$, the gate 59, 60, 62 performing the operation $$\left||A-B|-A'\right|$$

to provide difference signal B′.

While the gate circuit 59, 60, 62 is included in each difference unit 28, 38, where bi-level or "black" and "white" signals are employed, the circuits are equally applicable to gray scale signals in which case the gate circuits 59, 60, 62 is omitted with the difference signal being taken directly from either transistor 46, 47.

Figures 6, 7, 8:
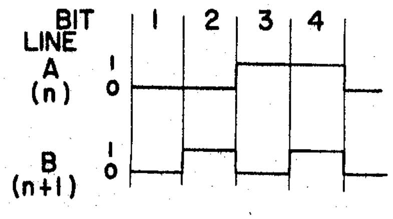
FIG. 6 shows portions of two adjacent scanning lines provided by the system of FIG. 4 and useful in explaining the mode of operation of the invention.
FIG. 7 is a table demonstrating the validity of the operation of the transmitting difference unit of the system of FIG. 4.
FIG. 8 is another chart showing the validity of the mode of operation of the receiving difference unit of the system of FIG. 4.

Referring now to FIGS. 6, 7 and 8, it is assumed that the first four elements of line B $(n+1)$ scanned by camera tube 22 are 0–1–0–1 while the first four elements of line A $(n)$ are 0–0–1–1. It is thus seen that there is no difference between the first and fourth elements of lines A and B, while there is a difference between the second and third elements of lines A and B. FIG. 7 is a chart showing the $A-B$ and $B-A$ operations performed by the transistors 46, 47 of the transmitting difference unit 28 and the final $|A-B|$ operation provided by the gate circuit 59, 60, 62 to provide the output difference signal 0–1–1–0 in response to the simultaneous comparison of the first four elements of lines A and B scanned by the camera tube 22. FIG. 8 is a chart showing the functioning of the receiving difference unit 38 in response to the same first four elements of lines A and B scanned by the camera tube 22. FIG. 8 shows the two operations $$A'-|A-B| \text{ and } |A-B|-A'$$

performed by the two transistors 46, 47 and the final operation $$\left||A-B|-A'\right|$$

performed by the gate circuit 59, 60, 62 to provide the output difference signal B′ 0–1–0–1 corresponding to line B scanned by the camera tube 22.

It will be observed that only change or difference information is transmitted, the receiving system reconstructing the original information from the change information. This requires that the first line of each frame be transmitted per se and displayed in the receiver in order to provide a reference signal (line $n$) for comparison with a first change or difference signal $|A-B|$. Reference to FIG. 3 will reveal two ways by which this may be accomplished with the dual beam camera and display tubes of the system of FIG. 4. A first method is to provide an over-scan of one line in the camera tube 22. Thus, at the beginning of one frame, beam 26 would scan the first line of the image to be transmitted while beam 25 would be scanning off the image. Thus, during scanning of the first line of the image by beam 26 of the camera tube, no video signal A would be applied to difference unit 28 and thus video signal B per se would be provided in output circuit 29 and in turn applied to the receiving difference unit 38. Likewise, display tube 39 is provided with a one line overscan so that at the beginning of a frame, only beam 43 would scan the display screen, beam 41 scanning off the field of view. Thus, during the scanning of the first line by beam 26 of camera tube 22, no video signal A′ would tron image-providing a corresponding charge image or pattern on the insulator 80 by secondary emission.

First and second conventional electron guns 84, 85 are provided in envelope 72 adjacent end 78 for respectively directing electron beams 26, 25 toward insulator 80. Conventional horizontal deflection electrodes 86, 87 and vertical deflection electrodes 88, 89 are provided for respectively rectilinearly scanning the two electron beams 26, 25. The horizontal deflection electrodes 86, 87 are both coupled to a conventional horizontal sweep generator 90. A voltage divider comprising resistors 92, 93 is cuopled across the output of conventional vertical sweep generator 94, vertical deflection electrodes 88 being coupled across resistor 92 and vertical deflection electrodes 89 being coupled across both resistors 92, 93, as shown. Horizontal and vertical sweep generators 90, 94 are synchronized by conventional sync. generator 95. The scanning of the two beams 26, 25 is thus synchronized horizontally and vertically and the two beams track together, however, by virtue of the respective coupling of vertical deflection electrodes 88, 89 across the appropriately chosen resistors 92, 93, beams 26, 25 are vertically scanned across insulator 80 with a vertical spacing of one scanning line so that beam 25 scans line $n$ while beam 26 scans line $n+1$.

In accordance with conventional image orthicon practice, the scanning beams 26, 25 do not impinge upon the surface of insulator 80, but are repelled therefrom responsive to the charge pattern thereon. The repelled beam **25*a* is received by a conventional output electrode 96 to which output circuit 23 is coupled while the repelled beam 26*a* is received by conventional output electrode 97 to which output circuit 24 is coupled. It will be understood that the output electrodes 96, 97 may comprise conventional electron multipliers. It is thus seen that the output video signal generated in output circuit 23, i.e., output signal A, is responsive to the charge pattern on insulator 80 corresponding to line $n$ of the input optical image while the output video signal generated in output circuit 24, i.e., signal B is responsive to the charge pattern on insulator 80 corresponding to line $n+1$ of the input optical image. It will be readily understood that sync. signals may be inserted in the $|A-B|$ difference signal provided by difference unit 28 by a conventional sync. insertion circuit 98**.

Referring now to FIG. 11, another form of "dual-beam" camera tube is shown which may also be employed in the system of FIG. 4. The camera tube 99 of FIG. 11 is of the image dissector type comprising an enclosing envelope 100 having a viewing end 102 with a photocathode 103 coated on its interior surface. Photocathode 103 thus emits an electron beam area-modulated in response to a radiation image impinging upon viewing end 102 of envelope 100. Electrode 104 is disposed in envelope 100 between photocathode 103 and the opposite end 104 and having defining apertures 105, 106 therein vertically spaced apart by the vertical spacing of one scanning line. Conventional electron multipliers 108, 109 receive the electrons which respectively pass through the defining apertures 105, 106 and direct the same to conventional output electrodes 110, 112 which are respectively coupled to output circuits 23, 24.

Vertical and horizontal magnetic deflection coils or yokes 113, 114 are provided surrounding envelope 100 and respectively coupled to vertical and horizontal sweep generators 115, 116, the vertical and horizontal sweep generators 115, 116 being in turn coupled to conventional sync. generator 95.

The vertical and horizontal deflection coils 113, 114 rectilinearly scan the electron beam provided by photocathode 103 across defining apertures 105, 106 thereby to generate the video output signal A in output circuit 23 responsive to line $n$ of the optical image and video output signal B in output circuit 24 responsive to line $n+1$ of the input optical image.

It will also be readily understood that yet another method of obtaining the two input signals A and B for the transmitting difference unit 28 is with the use of two separate conventional camera tubes positioned to view the same area, the beams of the two tubes being synchronized and tracking together with one scanning line $n$ of the input optical image while the other is scanning line $n+1$. It will be seen that a similar method may be used at the receiving station to reproduce the viewed material by means of separate conventional display and camera tubes in a manner analogous to scan conversion system. In such an arrangement, the output difference signal B′ of the receiving difference unit 38 would be applied to a conventional display tube which would scan and display line $n+1$ while a conventional camera tube would be arranged to view the display screen of the display tube and to scan the previously scanned line $n$, thereby to provide the video signal A′ for the receiving difference unit 38.

Referring now to FIG. 12, a separate display tube and camera tube for the receiving station described above may be combined in a single element "dual beam" tube 117, the specific tube shown in essence combining a conventional cathode ray display tube and an image orthicon. Here, tube 117 includes an enclosing envelope 118 having a faceplate 119 with a conventional phosphor coating 120 coated thereon. Envelope 118 has a neck portion 122 in which a conventional electron gun 123 and horizontal and vertical deflection electrodes 124, 125 are positioned. Control grid 126 of electron gun 123 is coupled to the B′ output circuit 40 of the receiving difference unit 38 and thus generates the "writing" electron beam 43 which is rectilinearly scanned over the phosphor display screen 120 by the horizontal and vertical deflection electrodes 124, 125. Horizontal deflection electrodes 124 are coupled to conventional horizontal sweep generator 127. A voltage divider comprising resistors 128, 129 is coupled across vertical sweep generator 130 and vertical deflection electrodes 125 are coupled across resistor 124.

In the image orthicon section 132 of the tube 117, a conventional target electrode 133 is provided having a transparent supporting insulator 134 with a transparent conductive coating 135 on the side thereof facing the phosphor display screen 120 and with a photo-emissive coating 136 on its other side facing end 137 of envelope 118. The transparent conductive electrode 135 is coupled to terminal 138 adapted to be connected to suitable source of potential as is well known to those skilled in the art. A conventional insulator 139 is positioned in image orthicon section 132 between the target electrode 133 and end 137 and a conventional secondary electron collector screen 140 is positioned adjacent insulator 139 on the side thereof facing the target electrode 133 and is connected to external terminal 142 adapted to be connected to a suitable source of external potential.

A conventional electron gun 143 is positioned adjacent end 137 of envelope 118 for generating "reading" electron beam 41 which is horizontally and vertically scanned rectilinearly by conventional horizontal and vertical deflection electrodes 144, 145. Horizontal deflection electrodes 144 are coupled to horizontal sweep generator 127 while vertical deflection electrodes 145 are coupled across both resistors 128, 129. Thus, the "writing" and "reading" electron beams 43, 46 are rectilinearly scanned in synchronism and track together, beam 43, however, scanning and displaying line $n+1$ on the phosphor display screen 120 while beam 41 is scanning the charge pattern on insulator 139 corresponding to the previously scanned line $n$ on the phosphor display screen 120. Beam 41 is repelled from the insulator 139 in response to the charge pattern thereon, the repelled beam **41*a* being received by conventional output electrode 146 which in turn is coupled to output circuit 45 thereby to provide the A′ video signal to the receiving difference unit 38. Again it will be understood that the output electrodes 146 may include conventional multiplier stages. It will be seen that with the "dual beam" display-image orthicon tube 117, the "reading" beam 41 does not destroy the displayed image provided by the "writing" beam 43**.

Conventional horizontal and vertical sync. separator circuits 147, 148 respectively couple output circuit 37 of the bandwidth restoration unit 36 to the horizontal and vertical sweep generators 127.

It will be understood that the voltage divider 92, 93 associated with the vertical sweep generator 94 of the "dual-beam" camera tube 70 of FIG. 10 and the voltage divider 128, 129 associated with the vertical sweep generator 130 of the "dual-beam" display tube 117 respectively provide the requisite separation between the two beams, slightly different instantaneous voltages having identical waveforms being applied to the vertical deflection electrodes, the difference in the instantaneous voltages being equal to the amount required to deflect the beam in the equivalent of one scanning line. It will be seen that any conventional vertical sweep waveform may be employed such as sawtooth or stair-step.

Referring now to FIGS. 13 and 14, there is shown a bandwidth compression and restoration system which may be used in conjunction with the "dual-beam" difference scanning line system of FIG. 4; the bandwidth compression and restoration system of FIG. 13 is more fully described and illustrated in the aforementioned Greutman and Hoag application Ser. No. 318,682. Here, with which an image dissector-type tube 99 being employed having vertical and horizontal deflection coils 113, 114, as shown in FIG. 11, a conventional sweep generating circuit, i.e., a constant current source 149, is provided coupled to fast and normal sweep timing circuits 150, 152, which in turn are coupled by fast-normal sweep switch 153 to one of the deflection coils 113, 114; it will be understood that another sweep generating circuit, fast and normal sweep timing circuits and fast-normal sweep switch will be provided for the other deflection coil. Fast and normal sweep timing circuits 150, 152 may be suitable timing resistors respectively cooperating with a timing capacitor in the sweep generating circuit 149 respectively to provide fast and slow sweep rates, the fast-normal sweep switch 153 selectively coupling one or the other of the fast and normal sweep timing circuits 150, 152 to the respective deflection coil 113, 114 thereby selectively to provide fast and slow scanning rates for the camera tube 99.

A conventional four-bit storage shift register circuit 154 is provided having its signal input circuit coupled to output circuit 29 of difference unit 28. Fast and normal rate shift pulses for the shift register 154 are provided by fast and normal shift pulse generators 155, 156. Here, each scanning line in the camera tube 99 is divided into a number of elements each having a duration at least equal to the minimum anticipated video signal element and the pulse repetition frequencies of the shift pulse generators 155, 156 are chosen so that shift pulse generator 155 provides a number of shift pulses equal to the number of video signal elements during one scanning line provided by the fast-sweep timing circuit 150 and likewise shift pulse generator 156 provides the same number of shift pulses during one scanning line provided by the normal sweep timing circuit 152. Output circuits 157, 158 of the fast, normal shift pulse generators 155, 156 are selectively coupled to the shiftpulse input circuits of shift register 154 by fast-normal switch 159. The bit storage output circuits of shift register 154 are coupled to a conventional logic circuit 160 which senses the simultaneous presence of four identical video signal elements in the shift register 154 and provides an output signal in response thereto in its output circuit 162. In most instances, the redundancy in the difference signal $|A-B|$ in the output circuit 29 of difference unit 28 upon which the bandwidth compression system operates will be "white" and thus the logic circuit 160 will sense or detect the simultaneous presence of four "white" video signal elements in the shift register 154; it will be understood that the "white" video signal elements may be either "white"-positive, i.e., a "one" or "white"-negative, i.e., "zero."

When four "white" signal elements are simultaneously present in the shift register 154, these video signal elements are shifted out of the shift register 154 at the fast rate with four new video signal elements being at the same time shifted into the shift register 154. To accomplish this, output circuit 162 of the logic circuit 160 is coupled to multivibrator 163 and thus the output signal from logic circuit 160 indicating the simultaneous presence of four "white" video signal elements in shift register 154 sets multivibrator 163 to initiate a pulse. The output circuit 164 of the fast-normal switch 159 which couples the fast and normal shift pulses to the shift register 154 is also coupled to a 4:1 count-down circuit 165. Count-down circuit 165 thus counts-down the fast or normal shift pulses, as the case may be, and provides one pulse in its output pulse 166 in response to four shift pulses. Output circuit 166 of the count-down circuit 165 is coupled to the reset circuit of multivibrator 163 so that the pulse provided by the count-down circuit 165 resets multivibrator 163 to terminate the output pulse which was initiated by a pulse in output circuit 162 of logic circuit 160 in response to the simultaneous presence of four "white" video signal elements in shift register 154.

Output circuit 167 of multivibrator 163 is coupled to fast-normal sweep switch 153 and fast-normal sweep switch 159 for respectively actuating the same. Thus, assuming that the fast-normal sweep switch 153 has coupled the normal sweep timing circuit 152 to the respective deflection coil 115, 114 and that the fast-normal sweep switch 159 has coupled the normal rate shift pulse generator 156 to the shift register 154, four video signal elements will be shifted into shift register 154 at the normal or slow rate. When these four video signal elements are shifted into the shift register 54 and if all four are "white," that fact is sensed by the logic circuit 160 to provide an output signal which "sets" multivibrator 163 to provide an output pulse in its output circuit 167 which actuates fast-normal sweep switch 153 to couple the fast sweep timing circuit 150 to the respective deflection coil 113, 114 and which actuates fast-normal sweep switch 159 to couple the fast rate shift pulse generator 155 to shift register 154. The four "white" video signal elements in the shift register 154 are thus shifted out of the shift register in output circuit 168 at the fast rate while four new video signal elements which have been scanned at the fast rate are shifted into the shift register 154 at the fast rate. At the end of four fast shift pulses counted-down by count-down circuit 165, multivibrator 163 is reset to terminate the pulse in its output circuit 167. If at that instant, all four video signal elements in the shift register 154 are again "white," multivibrator 163 will immediately again be set so that the fast sweep timing circuit 154 remains coupled to the respective deflection coil 113, 114 and the fast rate shift pulse generator 155 remains coupled to the shift register 154. On the other hand, if at the conclusion of the first pulse provided by multivibrator 163, one or more of the video signal elements which have been shifted into the shift register 154 at the fast rate are "black," no output signal will be provided in output circuit 162 of logic circuit 160, fast-normal sweep switch 153 will be actuated by termination of the multivibrator pulse to couple the normal sweep timing circuit 152 to the respective deflection coil 113, 114, and fast-normal switch 159 will be actuated to couple the normal rate shift pulse generator 156 to the shift register 154, so that the four video signal elements stored therein will be shifted out at the normal or slow rate and four new video signal elements which have been scanned at the slow rate will be shifted into the shift register at the slow rate.

Output circuit 168 of the shift register 154 is coupled to a video level modifying unit 169 which may be any conventional amplifier having its gain selectively adjustable between lower and higher levels. Output circuit 167 of multivibrator 163 is coupled to the video level modifying unit 169 for actuating the same to provide a third video signal level in response to the multivibrator pulse which, as indicated above, is co-extensive with the four "white" video signal elements shifted out of the shift register 154 at the fast rate. Thus, assuming that "black" is negative, i.e., "zero" and that the normal rate "white" video signal elements are positive, i.e., "one," video level modifying unit 169 would provide a third still higher level video signal in response to the multivibrator pulse.

Referring now to FIG. 14, FIG. 14A shows a portion of one scanned line of the video signal $|A-B|$ output from the difference unit 28 which would be provided with scanning of the line at the normal or slow rate. Here, the signal is shown as being "black" negative ("zero") and "white"-positive ("one"), the line being divided into eleven "white" video signal elements 170, two black video signal elements 172 and six white video signal elements 173.

Referring now to FIG. 14B with the bandwidth compression system shown in FIG. 13, the first four "white" video signal elements 170–1 through 170–4 which have been scanned at the normal or slow rate are shifted into the shift register 154 by four normal or slow rate shift pulses, one for each of the "white" video signal elements 170–1 through 170–4. When the four video signal elements 170–1 through 170–4 are all in the shift register 154, logic circuit 160 provides an output signal which sets multivibrator 163 to initiate pulse 174. Pulse 174 actuates fast-normal sweep switch 153 and fast-normal sweep switch 159 to provide scanning at the fast rate and the application of fast shift pulses to the shift register 154. The next four "white" video signal elements 170–5 through 170–8 are thus scanned at the fast rate and shifted into the shift register 154 at the fast rate while the first four video signal elements 170–1 through 170–4 are shifted out of the shift register 154 into the output circuit 168 at the fast rate as shown in FIG. 14D. Multivibrator pulse 174 is also applied to the video level modifying unit 169 to initiate the third "fast white" output signal 175, as shown in FIG. 14E.

The four fast shift pulses which have shifted video signal elements 170–1 through 170–4 out of the shift register 154 and have shifted the next four "white" video signal elements 170–5 through 170–8 into the shift register are counted-down by the count-down circuit 165 thereby terminating multivibrator pulse 174, as shown at 176 in FIG. 14C. However, at the termination of the fast-sweep signal 174 provided by multivibrator 163, it will be observed that another four "white" video signal elements 170–5 through 170–8 are now simultaneously present in the shift register 154 and are sensed by the logic circuit 160 to provide another output signal to "set" multivibrator 163 to initiate a new fast-sweep signal 177. Thus, the fast-sweep continues and the three "white" video signal elements 170–9 through 170–11 and the first "black" video signal element 172–1 which have been scanned at the fast rate, are shifted into the shift register 154 at the fast rate, as shown in FIG. 14B. At the termination of the fast sweep pulse 177 in response to counting down of four fast shift pulses by the count-down circuit 165, it will be seen that one "black" video signal element, i.e., 172–1 is present in the shift register 154 so that no output signal is generated by logic circuit 160. Thus, the fast sweep signal 177 is removed from the fast-normal switch 153 so that the normal sweep timing circuit 152 is coupled to the respective deflection coil 113, 114, and is likewise removed from the fast-normal switch 159 so that the normal rate shift pulses are applied to the shift register 154. Thus, the three "white" video signal elements 170–9 through 170–11 and the one "black" video signal element 172–1 which were scanned at the fast rate and shifted into the shift register 154 at the fast rate, are shifted out of the shift register to output circuit 168 and video level modifying unit 169 at the slow rate, as shown in FIG. 14E. It will further be seen that termination of the fast-sweep signal 177 and thus its removal from the video modifying unit 169 terminates the third level or "fast white" signal 175 to provide the normal sweep "white" level signal 178 during the application of "white" video signal elements 170–9 through 170–11 to the video level modifying unit 169, and "black" level video signal 179 during the "black" level video signal 172–1 applied to the video level modifying unit 169.

Referring back to FIG. 13, a fast-normal level detector 180 is coupled to input terminal 35 and may comprise any conventional level detector circuit for detecting the third level or "fast white" video signal. Thus, fast-normal level detector 180 detects video signals having an amplitude level above the threshold level of the normal speed "white" video signals, as shown by the dashed line 182 in FIG. 14E, to provide fast sweep signals 183, as shown in FIG. 14F, in its output circuit 184. Another conventional sweep generating circuit 185 is provided together with fast and normal sweep timing circuits 186, 187, which may be identical to the sweep generating circuit 144 and the fast and normal sweep timing circuits 150, 152 of the transmitting station. Fast-normal sweep switch 188 selectively couples the fast and normal sweep timing circuits 186, 187 to the deflection electrodes 125, 145 of the "dual beam" display tube 117, which may be of the type described above in conjunction with FIG. 12. Thus, detection of the third level or "fast white" signal 175 by the fast-normal level detector 180 will result in generation of fast sweep signal 183 which will actuate the fast-normal sweep switch 188 to couple the fast-sweep timing circuit 186 to deflection electrodes 125, 145 thereby to provide fast sweep of the writing beam 143 and reading beam 46 at the same rate as the fast sweep applied to camera tube 99.

Another video level modifying unit 189 is provided which may again be an amplifier having a gain selectively adjustable between upper and lower levels. Output circuit 184 of fast-normal level detector 180 is coupled to video level modifying unit 189 to adjust the gain thereof to the lower level in response to the fast sweep signal 183, thereby reducing the level of the third-level video signal 175 provided by video level modifying unit 169 and received at the input terminal 35 of the receiving station to the normal "white" level 178.

It will now be seen that during the interval of the third level or "fast white" video signal 175, fast-normal level detector 180 provides fast-sweep signal 183 thereby actuating fast-normal sweep switch 188 to provide fast scanning of the "writing" and "reading" beams and also to reduce the gain of video level modifying unit 189 to provide a normal "white" level video signal in output circuit 37 of the video level modifying unit 189 which applies the signal $|A-B|$ to the difference unit 38. Thus, with the "writing" and "reading" beams of the display tubes being scanned at the fast rate during fast sweep signal 183, the initially fast-scanned "write" video signal elements 170–1 through 170–4 of the $|A-B|$ signal are applied to the difference unit 38 along with the A signal, the elements of which have also been scanned at the fast rate, thereby to generate the same difference signal B′ as though the $|A-B|$ and A′ signals have been scanned at the normal sweep rate, as shown in FIG. 14G. In this connection, it will be observed that the $$\left||A-B|-A'\right|$$

operation performed by the difference unit 38 will be valid and provide the same difference signal B′ whether the input $|A-B|$ and A′ signals have been scanned at the fast or normal rate, the resulting B′ difference signal functioning in the same manner in the display tube 117 to "write" the line $n+1$ since it too is being scanned at the same rate as the input $|A-B|$ and A' signals, i.e., fast or slow as the case may be.

It will now be seen that the difference scanning line system of the invention increases the signal redundancy and thus the potential for time-bandwidth compression, the compression obtainable depending upon the resolution of the system, the time-bandwidth compression method employed and the form of the material to be transmitted. It will further be observed that the difference line scanning system of the invention, by increasing the signal redundancy, also lends itself to incorporation in time-sharing transmission systems and further, when used alone without time-bandwidth compression systems or time sharing systems, provides a form of secrecy system, i.e., the transmitting difference unit 28 can be regarded as an encoding device and the receiving difference unit 38 as a decoding device.

While there have been described above the principles of this invention in connection with specific apparatus, it is to be clearly understood that this description is made only by way of example and not as a limitation to the scope of the invention.

What is claimed is:

1. In an information transmission system: means for generating a first time-based electrical signal having a characteristic variable in response to the information to be transmitted; means for generating a second time-based electrical signal duplicative of said first signal but delayed therefrom by a predetermined time; first means for simultaneously comparing said characteristic of said first and second signals and for generating a third time-based electrical signal having a characteristic variable in response to a difference between said first and second signal characteristics; means for transmitting said third signal and means for receiving the same; means for generating a fourth time-based electrical signal having a variable characteristic for application to utilization apparatus; and means for generating a fifth time-based electrical signal duplicative of said fourth signal but delayed therefrom by said predetermined time; said fourth signal generating means including second means for simultaneously comparing said characteristics of the received third signal and said fifth signal thereby to generate said fourth signal having its said characteristic variable in response to a difference between said third and fifth signal characteristics.

2. The system of claim 1 wherein all of said characteristics are amplitudes.

3. The system of claim 1 wherein said transmitting means includes bandwidth compression means and said receiving means includes bandwidth restoration means.

4. The system of claim 1 wherein all of said characteristics are amplitudes, wherein said first signal comparing means includes means for detecting the magnitude of the difference between the amplitudes of said first and second signals and for generating said third signal in response thereto, and wherein said second signal comparing means includes means for detecting the magnitude of the difference between the amplitudes of said received third signal and said fifth signal and for generating said fourth signal in response thereto.

5. The system of claim 4 wherein each of said detecting means is a differential amplifier.

6. The system of claim 1 wherein all of said characteristics are bi-level amplitude pulses; wherein said first signal comparing means comprises first differential amplifier means for providing first signal pulses responsive to a difference between the amplitudes of said first and second signals, and first gate means for passing only said first signal pulses having a predetermined polarity thereby to provide said third signal; and wherein said second signal comparing meanns comprises second differential amplifier means for providing second signal pulses responsive to a difference between the amplitudes of said received third signal and said fifth signal, and second gate means for passing only said second signal pulses having a predetermined polarity thereby to provide said fifth signal.

7. The system of claim 1 wherein all of said characteristics are bi-level amplitude pulses; wherein said first signal comparing means includes means for performing the operation $A-B$ on said first and second signals to provide a first difference signal, means for performing the operation $B-A$ on said first and second signals to provide a second difference signal, and means for performing the operation $|A-B|$ on said first and second difference signals thereby to provide said third signal, where B is said first signal and A is said second signal; and wherein said second signal comparing means includes means for performing the operation $A-|A-B|$ on said received third and fifth signals to provide a third difference signal, means for performing the operation $|A-B|-A'$ on said received third and fifth signals to provide a fourth difference signal, and means for performing the operation $$\left| |A-|B-A' \right|$$

on said third and fourth difference signals thereby to provide said fourth signal where A' is said fifth signal and $|A-B|$ is said received third signal.

8. In a television system: means including camera tube means having rectilinear scanning means therefor for simultaneously providing first and second video signals corresponding respectively to two adjacent scanning lines, first means for simultaneously comparing said first and second video signals and for providing a third video signal in response to a difference between said first and second video signals; means for transmitting said third video signal and means for receiving the same; means for providing a fourth video signal; and means including display tube means and second rectilinear scanning means therefor for displaying said fourth video signal in successive scanning lines and for providing a fifth video signal corresponding to the scanning line immediately preceding the line being scanned with said fourth video signal; said means for providing a fourth video signal including second means for simultaneously comparing the received third video signal and said fifth video signal thereby to provide said fourth video signal in response to a difference between said received third and fifth video signals.

9. In a television system: means including camera tube means having first rectilinear scanning means for generating a first video signal in successive scanning lines and means for generating a second video signal duplicative of said first video signal but delayed therefrom by the duration of one of said scanning lines; first means for simultaneously comparing said first and second video signals and for generating a third video signal in response to a difference between said first and second video signals; means for transmitting said third video signal and means for receiving the same; means for generating a fourth video signal; display tube means having second rectilinear scanning means for displaying said fourth video signal in successive scanning lines; and means for generating a fifth video signal duplicative of said fourth video signal but delayed therefrom by the duration of one of said scanning lines; said fourth video signal generating means including second means for simultaneously comparing said received third video signal and said fifth video signal thereby to generate said fourth video signal in response to a difference between said received third and fifth video signals.

10. The system of claim 9 wherein said camera tube means includes said second video signal generating means.

11. The system of claim 9 wherein said second video signal generating means comprises means for delaying said first video signal.

12. The system of claim 9 wherein said display tube means includes said fifth video signal generating means.

13. The system of claim 9 wherein said fifth video signal generating means comprises means for delaying said fourth video signal.

14. The system of claim 9 for transmitting two color images wherein all of said video signals are bi-level pulses; wherein said first comparing means comprises first differential amplifier means for performing the operations $A-B$ and $B-A$ on said first and second video signals respectively to provide first and second difference signals, and first gating means for performing the operation $|A-B|$ on said first and second difference signals thereby to provide said third video signal, where $B$ is said first video signal and $A$ is said second video signal; and wherein said second signal comparing means comprises second differential amplifier means for performing the operations $A'-|A-B|$ and $|A-B|-A'$ on said received third and fifth video signals respectively to provide third and fourth difference signals, and second gating means for performing the operation $$\big||A-B|-A'\big|$$

on said third and fourth difference signals thereby to provide said fourth video signal, where $A'$ is said fifth video signal and $|A-B|$ is said received third video signal.

15. In a television system: camera tube means comprising means for converting an optical image into a corresponding electrical characteristic pattern, first rectilinear scanning means for scanning said pattern in successive scanning lines, and means including first and second output circuit means for simultaneously generating first and second video signals in response to two adjacent scanning lines, respectively, whereby each line of said image is scanned twice and said second video signal is duplicative of said first video signal but delayed therefrom by the duration of one scanning line; first means for simultaneously comparing said first and second video signals and for generating a third video signal in response to a difference between said first and second video signals; means for transmitting said third video signal and means for receiving the same; means for generating a fourth video signal; display tube means having second rectilinear scanning means for displaying said fourth video signal in successive scanning lines; and means for generating a fifth video signal duplicative of said fourth video signal but delayed therefrom by the duration of one of said scanning lines; said fourth video signal generating means including second means for simultaneously comparing said received third video signal and said fifth video signal thereby to generate said fourth video signal in response to a difference between said received third and fifth video signals.

16. In a television system: means including camera tube means having first rectilinear scanning means for generating a first video signal in successive scanning lines and means for generating a second video signal duplicative of said first video signal but delayed therefrom by the duration of one of said scanning lines; first means for simultaneously comparing said first and second video signals and for generating a third video signal in response to a difference between said first and second video signals; means for transmitting said third video signal and means for receiving the same; means for generating a fourth video signal; display tube means comprising means including second rectilinear scanning means for converting said fourth video signal into an optical image in successive scanning lines; and means for generating a fifth video signal corresponding to the scanning line immediately preceding the line being scanned with said fourth video signal whereby said fifth video signal is duplicative of said fourth video signal but delayed therefrom by the duration of one scanning line; said fourth video signal generating means including second means for simultaneously comparing said received third video signal and said fifth video signal thereby to generate said fourth video signal in response to a difference between said received third and fifth video signals.

17. In a television system: camera tube means comprising means for converting an optical image into a corresponding electrical characteristics pattern, first rectilinear scanning means for scanning said pattern in successive scanning lines, and means including output circuit means for generating a first video signal in response to said scanning; signal delay means coupled to said output circuit means for delaying said first video signal by the duration of one of said scanning lines thereby to provide a second video signal; first means coupled to said output circuit means and to said delay means for simultaneously comparing said first and second video signals and for generating a third video signal in response to a difference between said first and second video signals; means for transmitting said third video signal and means for receiving the same; means for generating a fourth video signal; display tube means having second rectilinear scanning means for displaying said fourth video signal in successive scanning lines; and means for generating a fifth video signal duplicative of said fourth video signal but delayed therefrom by the duration of one of said scanning lines; and said fourth video signal generating means including second means for simultaneously comparing said received third video signal and said fifth video signal thereby to generate said fourth video signal in response to a difference between said received third and fifth video signals.

18. In a television system: means including camera tube means having first rectilinear scanning means for generating a first video signal in successive scanning lines and means for generating a second video signal duplicative of said first video signal but delayed therefrom by the duration of one of said scanning lines; first means for simultaneously comparing said first and second video signals and for generating a third video signal in response to a difference between said first and second video signals; means for transmitting said third video signal and means for receiving the same; means for generating a fourth video signal; display tube means comprising second rectilinear scanning means for converting said fourth video signal into an optical image in successive scanning lines; and signal delay means coupled to said fourth video signal generating means for delaying said fourth video signal by the duration of one of said scanning lines; said fourth video signal generating means including second means coupled to said receiving means and to said signal delay means for simultaneously comparing said received third video signal and said fifth video signal thereby to generate said fourth video signal in response to a difference between said received third and fifth video signals.

19. In an information transmission system: means for generating a first time-based electrical signal having its amplitude variable in response to the information to be transmitted; means for generating a second time-based electrical signal duplicative of said first signal but delayed therefrom by a predetermined time; first means for selectively establishing fast and slow transmission rates for said first and second signals; first means for simultaneously comparing said amplitudes of said first and second signals and for generating a third time based electrical signal having its amplitude variable between first and second levels in response to the magnitude of the difference between said first and second signal amplitudes; means for sensing a predetermined amount of redundancy in one of said levels of said third signal and for providing a first control signal in response thereto; means for actuating said first establishing means to provide said fast transmission rate in response to said first control signal; means for modifying said third signal to provide a third level in response to said first control signal; means for transmitting said third signal and means for receiving the same; means for detecting said third level in said third signal and for providing a second control signal in response thereto; means for restoring the received modified third signal to said one level in response to said second control signal; means for converting a time-based electrical signal having its amplitude variable in response to information conveyed into output information; second means for selectively establishing said slow and fast rates for said converting means; means for generating a fourth time-based electrical signal having a variable amplitude for application to said converting means; means for generating a fifth time-based electrical signal duplicative of said fourth signal but delayed therefrom by said predetermined time; said fourth signal generating means including second means for simultaneously comparing said amplitudes of the restored third signal and said fifth signal thereby to generate said fourth signal having its amplitude variable in response to the magnitude of the difference between said restored third and fifth signal amplitudes; means for actuating said second establishing means to provide said fast converting rate in response to said second control signal.

20. In a television system: means including camera tube means having first rectilinear scanning means for generating a first video signal in successive scanning lines and means for generating a second video signal duplicative of said first video signal but delayed therefrom by the duration of one of said scanning lines; first timing means for selectively providing slow and fast scanning rates for said first scanning means; first means for simultaneously comparing said amplitudes of said first and second video signals and for generating a third video signal having an amplitude variable between first and said second levels in response to the magnitude of the difference between the amplitudes of said first and second video signals; means for sensing a predetermined amount of redundancy in one of said levels of said third video signal and for providing a first control signal in response thereto; means for actuating said first timing means to provide said fast scanning rate in response to said first control signal; means for modifying said third video signal to a third level in response to said first control signal; means for transmitting said third video signal and means for receiving the same; means for detecting said third level in the received third video signal and for providing a second control signal in response thereto; means for restoring the received modified third video signal to said one level in response to said second control signal; display tube means having second rectilinear scanning means for displaying a video signal in successive scanning lines; second timing means for selectively providing slow and fast scanning rates for said second scanning means; means for generating a fourth video signal having a variable amplitude for application to said display tube means; means for generating a fifth video signal duplicative of said fourth video signal but delayed therefrom by the duration of one of said scanning lines; said fourth video signal generating means including second means for simultaneously comparing the amplitudes of the restored third video signal and said fifth video signal thereby to generate said fourth video signal in response to the magnitude of a difference between the amplitudes of said rest and third and fifth video signals; and means for actuating said second timing means to provide said fast scanning rate in response to said second control signal.

21. A method of information transmission comprising the steps of: generating a first time-based electrical signal having a characteristic variable in response to the information to be transmitted; generating a second time-based electrical signal duplicative of said first signal but delayed therefrom by a predetermined time; simultaneously comparing said characteristics of said first and second signals and generating a third time-based electrical signal having a characteristic variable in response to a difference between said first and second signal characteristics; transmitting said third signal and receiving the same; converting a fourth time-based electrical signal having a variable characteristic into output information; generating a fifth time-based electrical signal duplicative of said fourth signal but delayed therefrom by said predetermined time; and simultaneously comparing the characteristics of the received third signal and said fifth signal and generating said fourth signal having its said characteristic variable in response to a difference between said third and fifth signal characteristics.

22. The method of claim 21 wherein all of said characteristics are amplitudes.

23. The method of claim 21 wherein said transmission step includes the step of compressing the bandwidth of said third signal, and said receiving step includes the step of restoring the bandwidth of the received third signal.

24. The method of claim 21 wherein said transmission step includes the further steps of detecting the presence of a predetermined amount of redundant information in said third signal, increasing the rate of generation of said first and second signals to a predetermined higher rate in response to said detection, and modifying the transmitted third signal in response to said detection; and wherein said receiving step includes the further steps of detecting the received modified third signal, increasing the rate of conversion of said fourth signal to said higher rate in response to said last-named detection, and removing said modification from the received third video signal in response to said last-named detection.

25. The method of claim 21 wherein all of said characteristics are bi-level amplitude pulses; wherein said first named comparing step includes the steps of performing the operation $A-B$ on said first and second signals to provide a first difference signal, performing the operation $B-A$ on said first and second signals to provide a second difference signal and performing the operation $|A-B|$ on said first and second difference signals thereby to provide said third signal, where B is said first signal and A is said second signal; and wherein said last-named comparing step includes the steps of performing the operation $$A'-|A-B|$$

on the received third signal and said fifth signal to provide a third difference signal, performing the operation $|A-B|-A'$ on said received third and fifth signals to provide a fourth difference signal, and means for performing the operation $$\left||A-B|-A'\right|$$

on said third and fourth difference signals thereby to provide said fourth signal, where A' is said fifth signal and $|A-B|$ is said received third signal.

26. A method of information transmission comprising the steps of: selectively generating a first time-based electrical signal at fast and slow rates having its amplitude variable in response to the information to be transmitted; generating a second time-based electrical signal duplicative of said first signal but delayed therefrom by a predetermined time; simultaneously comparing the amplitudes of said first and second signals and generating a third time-based electrical signal having its amplitude variable between first and second levels in response to the difference in the magnitude of the amplitudes of said first and second signals; detecting a predetermined amount of redundancy in one of said levels of said third signal and generating a first control signal in response thereto; generating said first signal at said fast rate in response to said first control signal; modifying said third video signal to provide a third level in response to said first control signal, transmitting said third signal and receiving the same; detecting said third level in the received modified third signal and generating a second control signal in response thereto; restoring said received modified third signal to said one level in response to said second control signal; selectively converting a fourth time-based variable amplitude electrical signal at said fast and slow rates into output information; generating a fifth time-based electrical signal duplicative of said fourth signal but delayed therefrom by said predetermined time; simultaneously comparing the amplitudes of said restored third signal and said fifth signal and generating said fourth signal having its amplitude variable in response to the magnitude of a difference between said restored third and fifth signal amplitudes; and converting said fourth signal at said fast rate in response to said second control signal.

27. A method of television transmission comprising the steps of: rectilinearly scanning an optical image and simultaneously generating first and second video signals corresponding respectively to two adjacent scanning lines on said image; simultaneously comparing said first and second video signals and generating a third video signal in response to a difference between said first and second video signals; transmitting said third video signal and receiving the same; rectilinearly scanning a fourth video signal and converting the same into an optical image; generating a fifth video signal corresponding to the scanning line immediately preceding the line being scanned with said fourth video signal, and simultaneously comparing the received third and fifth video signals and generating said fourth video signal in response to a difference between said received third and fifth video signals.

28. A method of television transmission comprising the steps of: rectilinearly scanning a first optical image in successive lines and generating a first video signal in response thereto; generating a second video signal duplicative of said first video signal but delayed therefrom by the duration of one scanning line; simultaneously comparing said first and second video signals and generating a third video signal in response to a difference between said first and second video signals; transmitting said third video signal and receiving the same; rectilinearly scanning a fourth video signal and converting the same into a second optical image; generating a fifth video signal duplicative of said fourth video signal but delayed therefrom by the duration of one scanning line; and simultaneously comparing the received third and fourth video signals and generating said fourth video signal in response to a difference between said received third and fifth video signals.

29. The method of claim 28 wherein said step of generating said second video signal comprises rectilinearly scanning said first image in successive lines whereby each line of said first image is scanned twice.

30. The method of claim 28 wherein said step of generating said second video signal comprises delaying said first signal.

31. The method of claim 28 wherein said step of generating said fifth video signal comprises rectilinearly scanning said second image in successive scanning lines.

32. The method of claim 28 wherein said step of generating said fifth video signal comprises delaying said fourth video signal.

References Cited

UNITED STATES PATENTS

| | | | |
|---|---|---|---|
| 3,347,981 | 10/1967 | Kagan et al. | 178—6 |
| 2,321,611 | 6/1943 | Moynihan. | |
| 2,957,941 | 10/1960 | Covely | 178—6 |
| 3,184,542 | 5/1965 | Horsley. | |

ROBERT L. GRIFFIN, Primary Examiner

C. R. VON HELLENS, Assistant Examiner

U.S. Cl. X.R.

178—6